US 9,721,220 B2

(12) United States Patent
Daulton et al.

(10) Patent No.: US 9,721,220 B2
(45) Date of Patent: Aug. 1, 2017

(54) ENVIRONMENTAL PERFORMANCE ESTIMATION (71) Applicants: Daniel J. Daulton, The Woodlands, TX (US); Randy Kuzawa, Katy, TX (US); James G. Wilke, The Woodlands, TX (US); Bridget Marie Todd, Cypress, TX (US); Daryl D. McCracken, Houston, TX (US)

(72) Inventors: Daniel J. Daulton, The Woodlands, TX (US); Randy Kuzawa, Katy, TX (US); James G. Wilke, The Woodlands, TX (US); Bridget Marie Todd, Cypress, TX (US); Daryl D. McCracken, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 972 days.

(21) Appl. No.: 14/046,584

(22) Filed: Oct. 4, 2013

(65) Prior Publication Data

US 2015/0100274 A1 Apr. 9, 2015

(51) Int. Cl.
G06F 11/30 (2006.01)
G21C 17/00 (2006.01)
G06Q 10/06 (2012.01)

(52) U.S. Cl.
CPC .............................. *G06Q 10/0639* (2013.01)

(58) Field of Classification Search
CPC .. A61K 2300/00; A61K 31/137; A61K 31/37; A61K 31/4439; A61K 31/4545; A61K 31/5377; A61K 36/899; A61K 38/47; A61K 38/56; A61K 31/00; A61K 31/198; A61K 31/22; A61K 31/366; A61K 31/40
See application file for complete search history.

(56) References Cited

U.S. PATENT DOCUMENTS

| 5,246,868 | A  | 9/1993  | Busch et al. |
| 7,096,084 | B2 | 8/2006  | Long et al.  |
| 8,289,994 | B2 | 10/2012 | Abdallah     |

(Continued)

FOREIGN PATENT DOCUMENTS

| WO | 0230553 A2    | 4/2002 |
| WO | 2013025653 A2 | 2/2003 |

OTHER PUBLICATIONS

Ellis et al., "Evaluation of a Gradient Sampling Design for Environmental Impact Assessment", Environmental Monitoring and Assessment, vol. 48: 1997, pp. 157-172.

(Continued)

*Primary Examiner* — Roy Y Yi
(74) *Attorney, Agent, or Firm* — Cantor Colburn LLP (57) ABSTRACT

A method of assessing environmental performance includes: receiving, by a processing device, input data related to aspects of an energy industry operation; estimating a first environmental impact of the operation based on the input data; selecting an alternative implementation of the operation; estimating a second environmental impact of the alternative implementation; comparing the first environmental impact and the second environmental impact; and generating an output based on the comparison, the output indicating a change in environmental impact associated with replacing the operation with the alternative implementation.

22 Claims, 9 Drawing Sheets (56) References Cited

U.S. PATENT DOCUMENTS

| | | |
|---|---|---|
| 8,337,613 B2 | 12/2012 | Zauderer |
| 8,475,739 B2 | 7/2013 | Holmes et al. |
| 2004/0077918 A1 | 4/2004 | McLeod |
| 2004/0117240 A1 | 6/2004 | Ness et al. |
| 2009/0177505 A1* | 7/2009 | Dietrich ............ G06Q 10/06375 705/7.37 |
| 2010/0023359 A1 | 1/2010 | Easo et al. |
| 2010/0274602 A1 | 10/2010 | Kaufman et al. |
| 2010/0332294 A1 | 12/2010 | Geis et al. |
| 2012/0173444 A1 | 7/2012 | Zik |
| 2013/0252858 A1 | 9/2013 | Plishka et al. |
| 2015/0100274 A1 | 4/2015 | Daulton et al. |

OTHER PUBLICATIONS

Evans, "Decision Analysis for Integrated Reservoir Management", SPE 65148, SPE European Petroleum Conference, Paris France, Oct. 24-25, 2000, 6 pages.

Grini et al., "Choosing Produced Water Treatment Technologies Based on Environmental Impact Reduction", SPE 74002, SPE International Conference on Health, Safety and Environment in Oil and Gas Exploration and Production, Kuala Lumpur, Malaysia, Mar. 20-22, 2002., 11 pages.

Knudsen et al., "Toward Zero Environmental Impact of the Produced Water", SPE 83994, Offshore Europe 2003, Aberdeen, UK, Sep. 2-5, 20043, 6 pages.

* cited by examiner

Environmental Performance Calculator V0.15 — 78

Instructions
The Environmental Performance Calculator Tab Has Required Data Divided Into Three Sections. Please Enter The Appropriate Data Into Each Field Or Select From The Dropdown Menus. As That Is Done, The Graphics Will Update Automatically On The Right Side Of The Screen. To See The Numeric Data Used To Illustrate The Graphics, Scroll To The Right.

Assumptions

Equipment Emissions Analysis
Diesel Consumption
- 50% Load per Pump
- Linear Extrapolation Of The Fuel Consumption Factors (Diesel)

Emissions
- 50% Load per Pump
- Linear Extrapolation Of Emissions Factors (CO, NOx, TPM)

Water Management Analysis
Disposal & Cost Savings
- Standard Vacuum Truck Capacity
- Average Truck Speed is 20 mph
- Truck Unload Time is 20 Minutes — 80
- Truck Load Time is 20 Minutes
- Truck Standby/Wait Time Is 10%
- 50% Vacuum Truck Mileage Multiplier Applied To Actual Roundtrip Mileage For Trucking Obstacles (Curvy Roads)

Water Treatment Assumptions
- 2.0% Waste Volume Factor
- No H2S
- EC Service Included
  >> 240 bbls/hour Throughput per Unit
  >> 10 Hour Work Days
  >> 2 To 4 Man Crews
- No Filtration Services Included
- Raw Water Frac Tanks (3)
- 30 Day Modular Tank Rental
- One-time Installation Cost For Modular tanks
- Regional Variation In:
  >> Rental/Installation Costs
  >> Water/Treatment/Disposal Costs

SmartCare Chemical Analysis
Conventional Fluid Assumptions
- Current Chemicals (Within Last Three Months)
- Publically Available Data (FracFocus) Is Representative For Areas/Plays
- Non-Hazardous Ingredients Justification Is:
  >> US FDA GRAS List (Primary)
  >> Lack Of Appearance On OSHA SDS Or Other Scientifically Based (Secondary)
- Maximum Ingredient In Additive Percentage Is Used
- Product List Built By Area/Play And System
  >> System Names Are Like For Like,
  eg. Crosslink=Crosslink, etc SmartCare Fluid Assumptions
- Using Optimized/Least Hazardous System
- Use Of H2prO Instead Of A Traditional Biocide
- SmartCare Products Are Qualified Through CEPR
- Cost Is Not A Factor
- Basic Package Of Products Assumed For Systems (eg. Iron Control, Clay Control, Non-emulsifier, etc.)

FIG.6

Equipment Emissions Analysis 82

| 11 | # Rhinos (max hhp/Pump 2,000 hhp) |
| 12.0 | Job Pump Time (hrs) |
| 80 | Average Total Pump Rate | BPM | UOM |
| 5,000 | Average Treating Pressure | PSI | UOM |
| 9,804 | hhp | | 84 |

Water Management Analysis

84 →

| | Central | Area | |
|---|---|---|---|
| 20,000 | Treatment Volume | bbls | UOM |
| 1 | Distance To Next Well | mi | UOM |
| 10 | Distance TO SWD Well | mi | UOM |
| 1 | Modular Tanks | | |

SmartCare Chemical Analysis

| Marcellus-Slick Water | Play-Frac Fluid Type | | |
|---|---|---|---|
| 40,000 | Fracturing Volume | bbls | UOM |
| 100 | % Fluid (For Non-Hybrids Enter 100) | | |

| Marcellus-20% HCL Acid | 238.1 | bbls | UOM |

Equipment Emissions Results (Estimated)

| | | | | | | | |
|---|---|---|---|---|---|---|---|
| 5,914 | Diesel With Conv. Tier II (Gallons) | | | | | | |
| 2,957 | Diesel With Bifuels (Gallons) | | | | | | |
| 2,957 | Reduced Diesel (Gallons) | | | | | | |
| | Hours=> | – | 4 | 8 | 12 | 16 | 20 |
| Reduced Emissions lbs | CO | – | 32.26 | 161.28 | 403.20 | 672.00 | 840.00 |
| | NOx | – | 25.82 | 129.09 | 322.73 | 537.88 | 672.35 |
| | TPM | – | 1.65 | 8.27 | 20.68 | 34.46 | 43.06 |

Water Management Analysis (Estimated)

| -$28,545 | Savings Using H2PrO w/Modular Tanks vs SWD |
|---|---|

| 98% | Truck Traffic Reduced |
|---|---|

SmartCare Chemical Analysis (Estimated)

| | Count | | Pounds Mass | |
|---|---|---|---|---|
| | BHI | Other | BHI | Other |
| Hazardous | 11 | 13 | 2,598 | 1,643 |
| Non-Hazardous | 4 | 3 | 3,460 | 5,711 |

FIG.7C

ENVIRONMENTAL PERFORMANCE ESTIMATION

BACKGROUND

There is a continuing effort in the energy industry to reduce the environmental impact of energy industry operations. Many of these operations, such as well construction (eg. drilling, bit selection [drilling time], cementing, solids management and fluids recycling, well logging), completions (e.g., hydraulic fracturing, acidizing, sand control), production (e.g., using production chemicals), transportation (e.g., transportation of water, hydrocarbons, flow assurance chemicals) and refining (e.g., refining chemicals), have environmental impacts, including emissions, water use and use of potentially hazardous chemicals. More environmentally friendly products and techniques have the potential to significantly reduce the environmental impact of such operations.

SUMMARY

A method of assessing environmental performance includes: receiving, by a processing device, input data related to aspects of an energy industry operation; estimating a first environmental impact of the operation based on the input data; selecting an alternative implementation of the operation; estimating a second environmental impact of the alternative implementation; comparing the first environmental impact and the second environmental impact; and generating an output based on the comparison, the output indicating a change in environmental impact associated with replacing the operation with the alternative implementation.

A system for assessing environmental performance includes: an input device configured to receive and store input data related to aspects of an energy industry operation; and a processing device in operable communication with the input device. The processing device is configured to perform: estimating a first environmental impact of the operation based on the input data; selecting an alternative implementation of the operation; estimating a second environmental impact of the alternative implementation; comparing the first environmental impact and the second environmental impact; and generating an output based on the comparison, the output indicating a change in environmental impact associated with replacing the operation with the alternative implementation.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

FIG. 6 depicts a portion of the computer program of FIG. 3 (including, e.g., general user instructions and program assumptions), which includes a display and interface for inputting data relating to an energy industry operation.

DETAILED DESCRIPTION

Techniques and methods are provided for assessing the environmental impact of an energy industry operation, system and/or service. A platform is provided that receives input data related to an operation, evaluates one or more environmental impacts of the operation, and estimates a potential change (e.g., reduction) in the environmental impact(s) based on a comparison with one or more alternatives. The results of the environmental impact evaluation and/or the potential reduction may be generated as an output, such as a display, graphic or report.

Alternatives considered using the methods described herein can be any modification or replacement of one or more aspects of the operation that is estimated to reduce the environmental impact of the operation if employed. Exemplary alternatives include using different fluids, alternative operating techniques or components, storage or transportation systems, fluids and solids management techniques or systems, equipment, alternative chemistry and fuels.

The techniques and methods provide an integrated tool for evaluating environmental performance in a number of categories related to different aspects of a system and/or operation. Exemplary categories include but are not limited to emission performance, water or other fluid management or use, and chemical analysis.

An embodiment of a processing device is configured to execute an algorithm or workflow that receives data related to a system, operation or service (referred to collectively as an "operation"), and performs an environmental performance assessment. The performance assessment includes a comparison between the current operation and alternative configurations, such as alternative components, processes or modifications. The impact assessment provides an estimation of the environmental, resource or other impacts that would result from employing the alternate configuration. The processing device is configured to generate an assessment output or result such as an environmental performance summary or report that provides information regarding alternatives that can be employed to reduce the impact of an operation.

Figure 1:
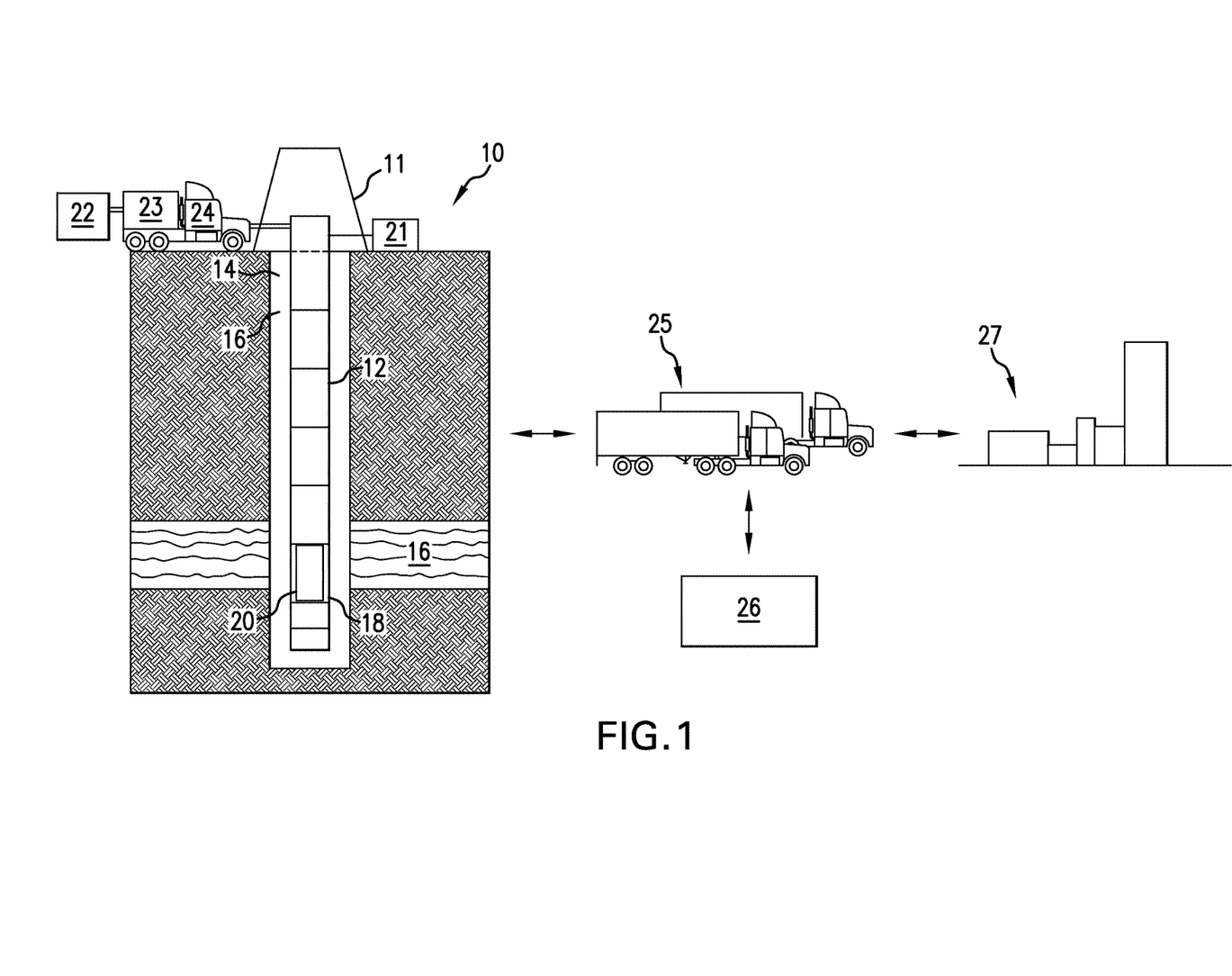
FIG. 1 depicts embodiments of systems for performing various energy industry operations.

FIG. 1 illustrates exemplary embodiments of systems and configurations for performing various energy industry operations. A well logging, exploration, production and/or drilling system 10 is shown. The system 10 includes a toolstring or borehole string 12 that is shown disposed in a borehole 14 that penetrates at least one earth formation 16 during a drilling, well logging and/or hydrocarbon production operation. In one embodiment, the system 10 includes a bottomhole assembly (BHA) 18. The BHA 18, or other portion of the borehole string 12, includes a tool 20 configured to perform one of various functions. Although the system 10 is shown as a single system, the system 10 is not so limited and represents various systems that are installed for performing various energy industry operations. For example, the system 10 includes a surface assembly configured to support and operate components for drilling, completion and production operations. During drilling operations, the surface assembly 11 is configured as a drill rig. During completion operations, the drill rig or other surface assembly 11 is used for stimulating (e.g., fracturing) a formation, cementing a borehole and/or casing a borehole. During production operations, the surface assembly 11 is configured as an oil rig or other assembly for extracting hydrocarbons.

The system 10 may be configured to perform various operations. The system may be used for well construction (e.g., drilling, well logging), completions (e.g., hydraulic fracturing), production, transportation, refining and others. For example, for well construction operations, the tool 20 includes a drilling assembly and drill bit configured to drill a borehole. Logging or measurement operations may be performed during drilling (e.g., using logging while drilling (LWD) tools), during other operations, or independently (e.g., via wireline tools). During a completion operation, for example, the string 12 is a completion string (e.g., jointed pipe or coiled tubing) in fluid communication with a pump and source of fracturing fluid, and the tool 20 includes a fracturing assembly. Fluid is pumped downhole to hydraulically fracture the formation 16 to stimulate hydrocarbon production. During production operations, the string 12 is a production string and the tool 20 includes various components to facilitate extracting hydrocarbons.

A control device 21 (e.g., a surface control and/or processing unit) may be coupled to the string 12, and a fluid storage device 22 (e.g., tank, mud processing system) is configured to provide a borehole fluid to the string 12 and/or borehole. A fluid control device including one or more pumps 23 is mounted on, e.g., a pump or fracturing truck 24.

Other systems that may be utilized in performing energy industry operation include a transportation system 25 for transporting hydrocarbons from a production site and/or transporting water, and transporting fluids (e.g., drilling, fracturing and production fluids) and other materials to and from the production site. For example, the transportation system 25 is used to transport operation materials (e.g., water, chemicals, drilling fluids, stimulation fluids, production fluids, proppants) from various sources 26 to the system 10. As shown in FIG. 1, the transportation system includes various trucks, although the system is not so limited. Various types of transportation may be used, such as marine vessels, trains, pipelines and combinations thereof. Other systems that may be utilized in energy industry operations include refinery systems. An exemplary refinery 27 is shown in FIG. 1, including oil storage tanks, a furnace, distillation towers and other processing and storage components.

Figure 2:
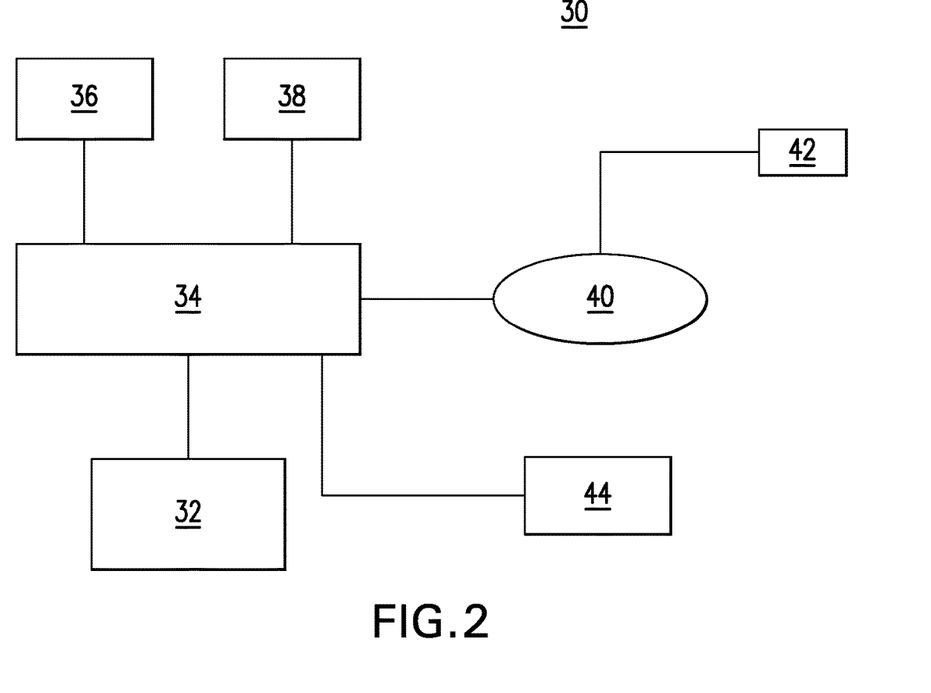
FIG. 2 depicts an embodiment of a data processing and environmental performance assessment system.

Referring to FIG. 2, an embodiment of a data processing and environmental performance assessment system 30 is shown. The system 30 includes a processing device or unit 32 such as a computer (e.g., desktop or laptop PC, smartphone, tablet, etc.), which may be connected to a host 34. The processing device includes suitable display and interface components to allow a user to input data for the environmental performance assessment and receive an assessment output. The processing unit 32 and the host 34 are not limited to the configurations described herein, and may include any suitable device or network including various processors, memory and communications devices to perform (e.g., pre-job, post-job and real-time) assessments of various well construction (eg. drilling, well logging), completion (e.g., hydraulic fracturing), production, transportation and refining operations.

In one embodiment, the processing system 32 and/or the host 34 includes a processor, memory, input/output devices and other components for execution of a computer program or algorithm to perform the methods described herein. The host 34 is connected to various data storage locations, which may be internal or external to the host 34. For example, the host 34 is connected to databases or memory areas that store information related to energy industry operations, products and systems that can be used for an assessment. Exemplary databases include a chemical information and/or regulatory database 36 and an operation database 38 storing information about different operations and/or alternatives. The host 34 may also be connected to a network such as the Internet 40 to allow the host 34 to retrieve information from external sources 42 such as regulatory and energy industry sources. In one embodiment, the system 30 includes a storage location or device, such as an assessment database 44, to allow results of assessments to be stored and distributed to multiple users.

The system 30 is configured to perform an environmental performance assessment method that enables evaluation of alternatives and communication and evaluation of sustainable oil and gas services which reduce impact upon the environment, and may reduce impacts such as resource requirements and cost inclusive. The assessment method for a given operation may be performed (but is not limited to) prior to performing the operation (pre-job), after performing the operation (post-job), and/or during the operation to generate real time assessments.

As described herein, performance of an assessment or method in "real-time" or "real time" refers to performance during or proximate in time to an energy industry operation, which may include receiving data generated upon or shortly after detection and/or acquisition by sensors or other monitoring devices. The received data may then be used in order to assess performance of the operation and/or modify operational parameters during the operation.

Figure 3:
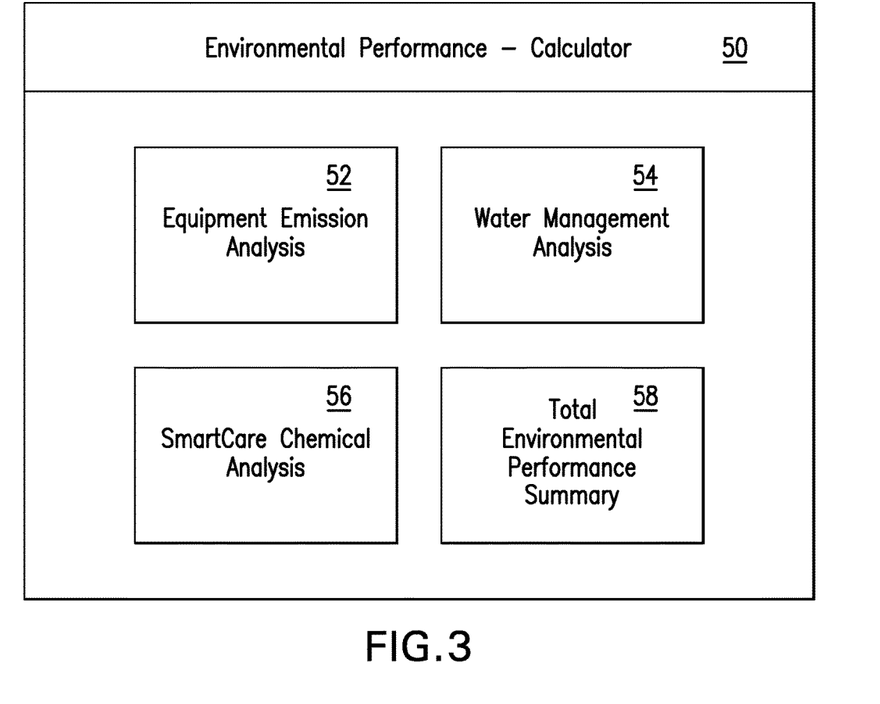
FIG. 3 depicts processing functions of an exemplary computer program for receiving input data, performing environmental performance assessment of an energy industry operation and/or system, and generating an environmental performance assessment result (the program and functions are not limited to the embodiments described herein)

In one embodiment, the system executes a computer program, e.g., a software program, that performs all or some of the components of the environmental performance assessment. FIG. 3 illustrates exemplary processing functions in an exemplary program configured as an environmental performance calculator 50. The calculator 50 performs one or more of the following processing functions: Equipment Emission Analysis 52, Water Management Analysis 54, Chemical Analysis 56, and a Total Environmental Performance summary 58.

FIG. 3, in one embodiment, illustrates a program display and/or user interface to provide information and/or instructions to a user to allow the user to interact with and/or customize the program calculations and output. For example, the processing function blocks 52, 54, 56 and 58 may include links, icons, checkboxes or other user interface elements to allow the user to select which analyses or processing functions are to be performed.

The methods and programs described herein may be configured as a portal or prototype that allows users to access additional information, e.g., to get a deeper technical view into chemical and emissions systems usage for various operations and systems. For example, the program may provide links or access to additional information regarding alternatives and the environmental impact of a current operation and available alternatives. The program can also provide a link or access to additional environmental information such as product or chemical descriptions and regulatory information.

As illustrated in FIG. 3, the environmental reduction analysis includes a number of performance assessment categories. In one embodiment, the performance assessment categories include chemicals, water management and equipment emissions. However, the analysis and methods herein are not limited to such categories, and can include analysis of any operations, services, systems and aspects thereof in order to assess potential environmental impact during energy industry operations such as well construction (e.g., drilling, well logging), completion (e.g., hydraulic fracturing) production, transportation and refining processes or operations.

Figure 4:
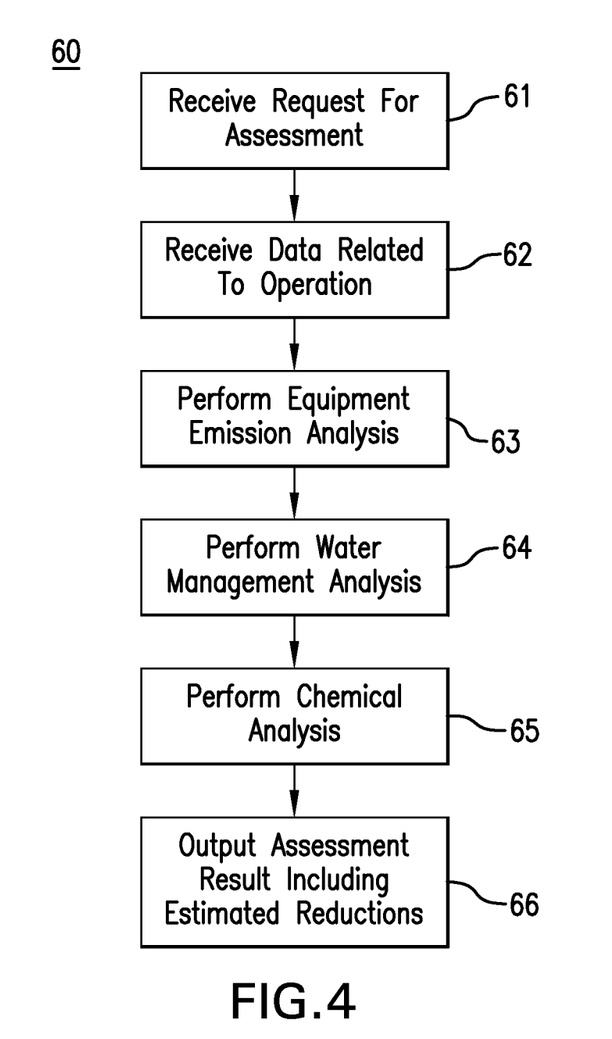
FIG. 4 is a flow diagram illustrating an exemplary method of assessing environmental performance of an energy industry operation and/or system and estimating potential environmental impact. The method includes one or more assessment categories, which are not limited to the specific examples of assessment categories described herein.

An embodiment of a method 60 is shown in FIG. 4. The method 60 may be performed (e.g., pre-job, post-job or real-time) on any suitable processor, processing device and/or network, such as the processing system 30 or components thereof. The method 60 includes one or more stages 61-66. In one embodiment, the method 60 includes the execution of all of stages 61-66 in the order described. However, certain stages may be omitted, stages may be added, or the order of the stages changed.

Figure 5:
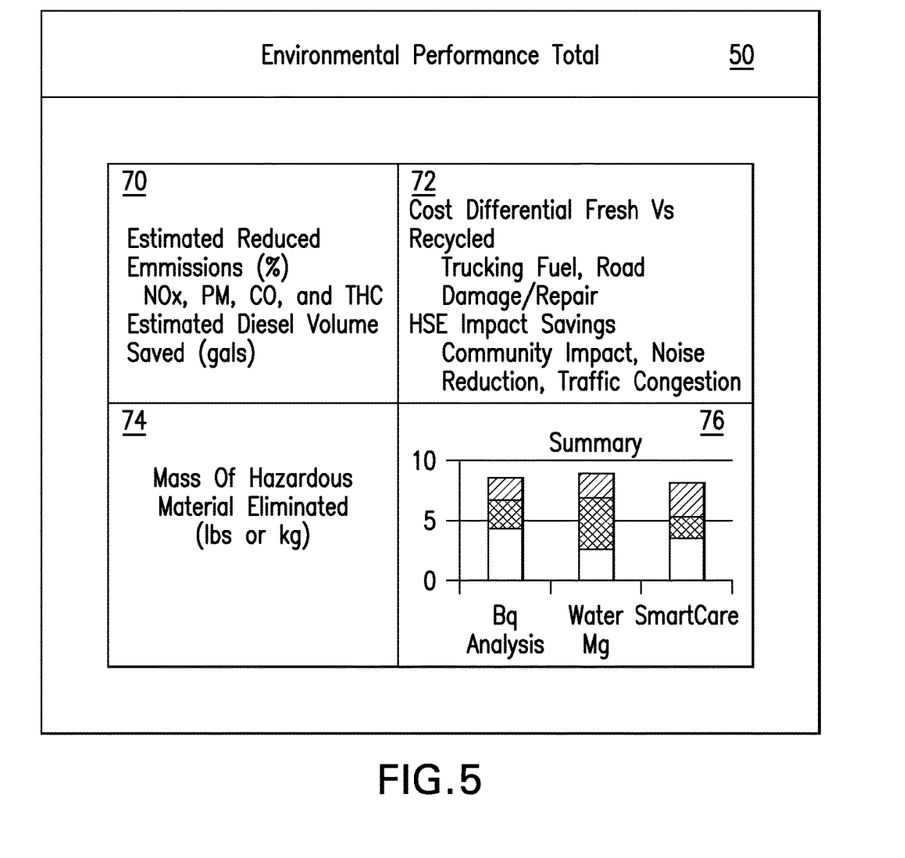
FIG. 5 depicts a portion of the computer program of FIG. 3, which includes an example of display and assessment results.

The method includes receiving information regarding a selected operation or system, identifying available or potential modifications or alternative implementations, and estimating an impact should one or more of the modifications be employed. The method also includes generating an impact output, such as a report, summary, visual display or other data structure that provides information regarding the estimated impact, and may also indicate the change or reduction in impact that would result from utilizing one or more alternative implementations. An example of an output is shown in FIG. 5, which includes emission analysis results 70, water management analysis results 72, chemical analysis results 74, and a results summary 76. As shown, the results may be presented in numerical and/or descriptive form, and in graphical form. Additional environmental performance information may also be included in the output as discussed further below. Although portions of the method 60 are described as being performed pre-job, they are not so limited and can be performed, e.g., post-job or in real time during an operation.

In the first stage 61, a processing device receives a request for environmental assessment or evaluation of an energy industry operation (e.g., well construction (eg. drilling, well logging), completions (eg. hydraulic fracturing) production, transportation and refining processes). For example, a user starts the environmental performance calculator 50.

In the second stage 62, input data related to the operation is received. Such input data includes information regarding various characteristics of an energy industry operation, such as equipment used, operational parameters, chemicals and/or fluid used, etc. The input data can be received through various means. For example, a user can input operation information such as the type of operation, planned operational parameters, resources used (e.g., borehole fluids, equipment, chemicals and equipment fuels). In addition, data can be received during an operation, from user input or real-time, directly from measurements performed by a control or monitoring unit (e.g., processing unit 32).

For example, referring to FIG. 6, a user inputs operation data into the performance calculator 50 via a display 78. The display includes instructions and checkboxes 80 to allow the user to input information regarding the operation. In this example, the input data is organized based on the performance assessment categories described above, but is not so limited. Additional information can be input, for example, via the display 82 shown in FIG. 7. The display 82 includes text boxes 84 for input of operational parameters such as pump rate, job time, water volume, and fracturing fluid type, but may not be limited to such displayed information.

In the third stage 63, a pre-job equipment emission analysis is performed. The processing device estimates characteristics related to emissions, estimates the environmental impact from emissions, and compares the environmental impact to an estimated environmental impact from one or more alternative implementations of the operation. For example, the processor estimates emissions resulting from fuels selected for the operation and compares those to alternative fuels or energy sources (eg. alternative combustion fuels, electric, solar panels, wind turbines) that could be used in place of the selected fuels.

In one embodiment, the emissions analysis includes estimation of the environmental impact of emissions components. Examples of such components include components related to non-road diesel engines (e.g., pump engines and drilling engines) during hydraulic fracturing or other drilling, completions and/or workover operations (onshore or offshore). Emissions from these components are compared to emissions from alternative equipment or other components, e.g., equipment utilizing natural gas as a diesel fuel substitute. Other alternatives include, e.g., engine emissions fueled electric or other non-conventional energy or fuel sources (eg. solar panels, wind turbines).

For example, the processing device receives data regarding a selected type of fuel for a fracturing operation, e.g., conventional diesel used in pumps 23, and operational parameters such as total pumping time (measured or predicted), average pump rate (BPM or $m^3$/min), truck running hours, and/or the number of trucks operating during the operation.

The processing device also receives or accesses data relating to alternative fuels, such as biodiesel or natural gas. In one example, the alternative fuel is a combination liquid natural gas (LNG) and diesel fuel (e.g., Rhino™ bifuel).

Other examples of alternative fuels include natural gas in various forms, such as CNG or field gas, which can be used in place of some portion of the diesel fuel. Such fuels can be including via retrofit packages to existing pressure pumping equipment which provide reduced emissions (NOx, CO2, TPM) and reducing diesel fuel (e.g., up to 70%) without sacrificing engine performance.

Various other types of data may be received and used in the analysis. For example, the LNG load in the bifuel is estimated to be 50%, and factors for emissions are also estimated. For example, switching from diesel to the bifuel is estimated to reduce NOx emissions by up to 50% (depending on substitution rate), reduce CO emissions by 20%, and reduce particulate matter (PM) emissions by about 70%. Reduction in hydrocarbon emissions can be determined by field tests and or other sources.

The emissions for conventional diesel and for bifuel (by mass) are estimated, and emission reduction is calculated by comparing the results. Other reductions that can be calculated include diesel volume reduction (Avg gal/hr*hrs*biofuel units.)

In the fourth stage 64, pre-job water and fluid management analysis is performed. The processing device estimates characteristics related to water use, sourcing, transportation and disposal, estimates the environmental impact, estimates cost saving with recycle rather than disposal and compares the environmental impact to an expected environmental impact from one or more alternative implementations. For example, the processor estimates reductions using alternatives such as closed loop drilling or fracturing, water treatment and recycling systems and methods, and produced and/or flowback fluid processing facilities.

For example, the processing device receives data regarding operational characteristics, and other information useful for performing the water management pre-job analysis. Examples include, for a fracturing operation, the total treatment volume of water required (e.g., $m^3$ or bbls), fresh water costs (e.g., $/bbl), and treated or recycled water costs (e.g., $/bbl). Other data may include disposal and transportation information such as trucking delivery distance (e.g., miles or km), flowback water processing (e.g., whether flowback water is sent to another well site to be completed, or whether flowback water is sent to a disposal site), the geographic area of operation (drives factors for trucking costs), and a Storage Cost Factor (e.g., based on frac tanks or modular tanks).

Based on the above data, the environmental impacts for the operation and for alternative implementations are estimated. Estimations include, for example, calculations of the total cost of water (e.g., $/bbls), including storage, disposal and trucking costs per operating area for fresh water, and the total cost of recycled or treated water. Other estimations include Health, Safety and Environment (HSE) impacts including the cost of potential spills, and truck traffic impacts (e.g., disposal mileage vs. treating mileage).

The impact reduction estimation includes, for example, the cost differential between fresh and recycled water (e.g., $/bbl), and HSE impact savings, including hard costs (e.g., $/bbl) and consider soft costs such as community impact, noise reduction, road wear and tear as well as traffic congestion.

Additional qualitative and/or quantitative reductions can be included in the result and output. For example, the analysis can include various value savings such as storage and transportation (trucking) savings in using some amount of recycled water, savings in transportation and disposal costs in minimizing waste water by recycling, reduced potential for spills, and "stranded" water use. Other benefits can be reported, such as the effect on water reduction on hydrocarbon production and field longevity.

Referring to FIG. 6, in one example, the water management analysis incorporates various estimates. These assumptions are displayed by the display 82. A user can select different values based on the selected operation, e.g., by selecting appropriate operation parameters. In addition, the user can modify different values based on the circumstances of the selected operation.

Various assumptions are shown in FIG. 6 regarding water treatment parameters for the selected operation, as well as for one or more alternative treatment options. Various types of water management services and treatment systems are available, which may be included in the water management analysis in estimating environmental impact.

In the fifth stage 65, pre-job chemical analysis is performed. The processing device compares characteristics related to the composition of a chemical product. Other characteristics may include operational parameters such as the rate of use of the product and/or the amount used.

The processing device estimates the environmental impact of one or more selected chemical substances or products, estimates the environmental impact of one or more alternative substances or products (and/or alternative operational parameters), and compares the environmental impact to an expected environmental impact from one or more alternative implementations. For example, the processor estimates impact using alternative formulations of fracturing or other types of fluid.

Examples of data inputs that can be used in the analysis include the volume (bbls or $m^3$) of a selected treatment fluid (or other chemical product), and characteristics and compositions of the selected treatment fluid. An exemplary treatment fluid is a conventional system that includes slickwater, linear, or crosslinked polymer systems. For example, input interfaces on the display 78 can be pre-populated with 4 options—Slick Water, Linear, Crosslinked & Weighted Average by % for Hybrid systems.

Other inputs include selection of one or more environmentally preferred fluids or compositions (e.g., used in H2prO™ water management services by Baker Hughes), selection of a conventional additive package, and selection of an environmentally preferred additive package. Such additive packages include constituents such as wet and dry additives, friction reducers/gelling agents, buffers, breakers, biocides/oxides, surfactant/nonemulsifers, scale inhibitor, clay control and crosslinkers.

"Environmentally preferred" fluids or compositions may be any fluid or composition that is considered to be less hazardous than the selected fluid. Such environmentally preferred fluids can be identified as such based on criteria established by private or governmental entities based on studies, testing, etc. Hazardous materials can be considered as such based on identification of the materials by appropriate regulatory bodies or other chemical assessment entities. For example, hazardous materials may be identified based on information from governmental bodies and sources such as the US Environmental Protection Agency, the European Commission, the United Nations' Global Harmonized System of Classification and Labeling (GHS/CLP), and industry sources such as the FracFocus Chemical Disclosure Registry.

The environmental impact of the selected composition is calculated, in one embodiment, by determining the amount of hazardous material in the selected fluid, and determining the amount of hazardous material in the alternative fluid. The "amount" can be calculated based on selected factors, such as the number of hazardous materials, the type of hazardous materials and/or the proportion of hazardous material in a fluid or product.

The processing device compares the amount of hazardous material estimated for the selected composition and the alternative, and outputs the difference as the environmental impact. An exemplary output includes hazardous material eliminated by using the alternative fluid.

As with the components and configurations in the other analysis sections, the chemical compositions, substances, products and related configurations are not limited to the embodiments described herein. For example, slurried polymer with and without the use of diesel as a portion of the carrier fluids could be calculated and presented as a hazardous chemical reduction. Any operation or component thereof that could be modified to reduce environmental impact can be subject to the methods described herein.

In the sixth stage 66, the pre-job assessment results from each component are compiled and provided as an output describing an estimation of the environmental impact. The output may be a report, display, graphic or other data structure. The output, in one embodiment, provides information regarding the selected operation, and the impact based on the emission analysis, the water management analysis and/or the chemical analysis. For example, the output is a report that indicates a reduction in emission, water savings and a reduction in an amount of hazardous material if an alternative implementation is used for the operation. The output may include any combination of qualitative, quantitative and descriptive information for relative comparison of chemical products.

Figure 7A:
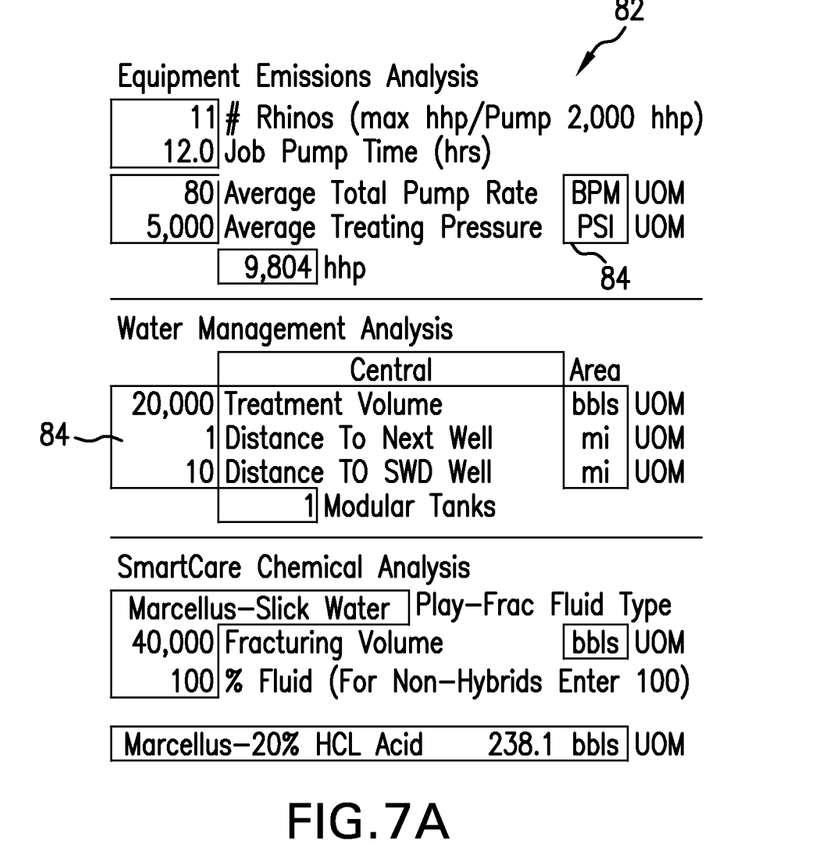
FIG. 7 depicts a portion of the computer program of FIG. 3, which includes a display and interface for inputting data, and assessment results.
Figure 7B:
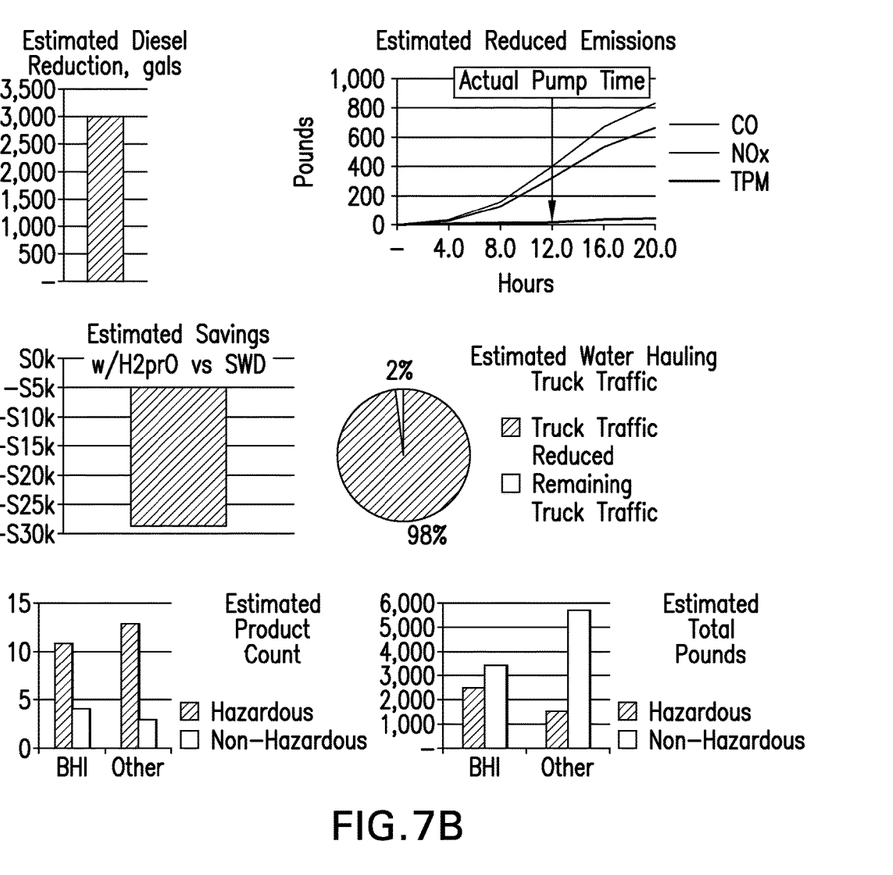
Figure 7C:
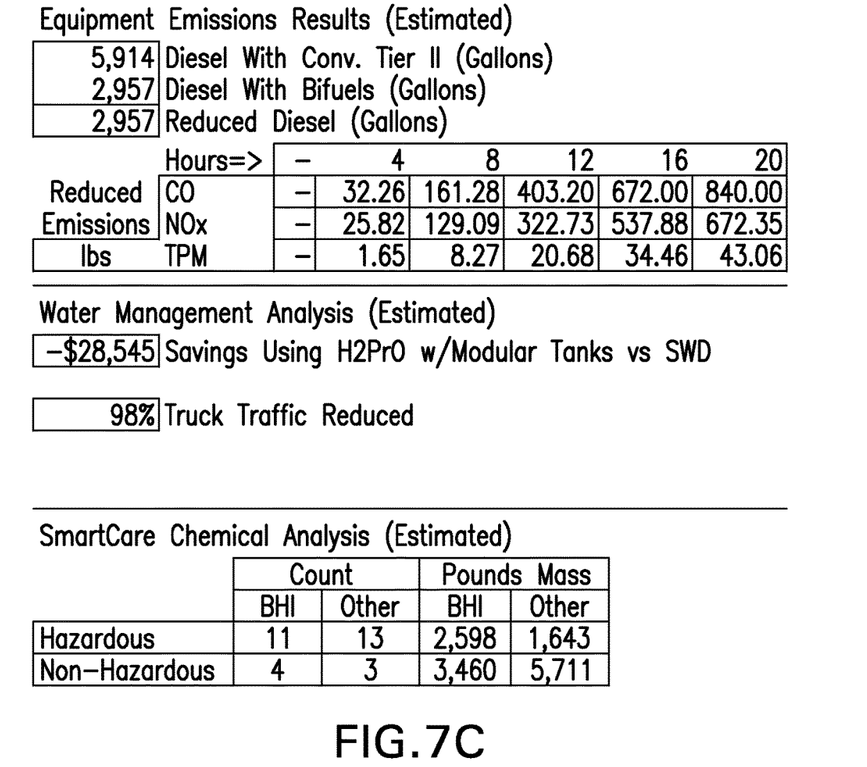

Examples of outputs are illustrated in FIGS. 5 and 7. As shown, the output or report can be any combination of descriptive, numerical and graphical elements. In the example shown in FIG. 7, the report combines and summarizes a customer's environmental performance based upon their potential use of alternative fuels (biofuels and reduced diesel), water management services to reduced freshwater usage, and environmentally friendly chemical products.

The report or output may include, in addition to numerical information, qualitative descriptions and/or descriptions of the assessment process. For example, the assessment results can be output (e.g., displayed, printed, etc.) as a report that summarizes each analysis component and provides the results of each component.

The report may be stored at a suitable location, e.g., accessible by multiple clients. For example, the report can be identified by a unique identifier (e.g., an API number) or cumulative identifier. In one embodiment, the reports are stored and transmitted via suitable networks to allow access at the wellsite, pad, field, or any other location.

The methods described herein can be performed before, during or after an operation. For example, the method 60 can be performed prior to an operation to facilitate planning. In another example, the calculator 50 automatically generates a report following application of environmental services into a well report, or pad report (cluster of wells), to allow for assessment of the environmental impact reduction in comparison to conventional services.

Generally, some of the teachings herein are reduced to an algorithm that is stored on machine-readable media. The algorithm is implemented by the computer processing system and provides operators with desired output.

One or more aspects of the present invention can be included in an article of manufacture (e.g., one or more computer program products) having, for instance, computer usable media. The media has therein, for instance, computer readable instructions, program code means or logic (e.g., code, commands, etc.) to provide and facilitate the capabilities of the present invention. The article of manufacture can be included as a part of a computer system or provided separately. These instructions may provide for equipment operation, control, data collection and analysis and other functions deemed relevant by a system designer, owner, user or other such personnel, in addition to the functions described in this disclosure.

One example of an article of manufacture or a computer program product for executing the methods described is a processing device or system such as the system 30, the processing unit 32 and/or the host 34. A computer program product includes, for instance, one or more computer usable media to store computer readable program code means or logic thereon to provide and facilitate one or more aspects of the methods and systems described herein. The medium can be an electronic, magnetic, optical, electromagnetic, infrared or semiconductor system (or apparatus or device) or a propagation medium. Example of a computer readable medium include a semiconductor or solid state memory (e.g., USB), magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W), Blu-ray and DVD.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of assessing environmental performance, the method comprising:
    receiving, by a processing device, input data related to aspects of an energy industry operation associated with extraction of hydrocarbons from an earth formation, the input data including parameters of the energy industry operation, the parameters including a selected type of fluid selected for injection into at least one of a borehole and the earth formation;
    estimating a first environmental impact of the operation based on the input data;
    selecting an alternative implementation of the operation, the alternative implementation including an alternative type of fluid that is different than the selected type of fluid;
    estimating a second environmental impact of the alternative implementation;
    comparing the first environmental impact and the second environmental impact; and
    generating an output based on the comparison, the output indicating a change in environmental impact associated with replacing the operation with the alternative implementation.

2. The method of claim 1, wherein estimating the first environmental impact and the second environmental impact includes estimating a chemical composition of the selected type of fluid selected for the operation and the alternative type of fluid selected for the alternative implementation.

3. The method of claim 1, wherein estimating the first environmental impact includes estimating emissions from a fuel selected for the operation, and estimating the second environmental impact includes estimating emissions from an alternative energy source selected for the alternative implementation.

4. The method of claim 1, wherein estimating the first environmental impact includes estimating characteristics relating to water use, and estimating the second environmental impact includes estimating characteristics relating to water use for one or more alternative water use implementations.

5. The method of claim 4, wherein the one or more alternative water use implementations are selected from at least one of water recycling, water treatment and disposal implementations.

6. The method of claim 1, wherein the selected type of fluid is a first formation treatment fluid and the alternative type of fluid is a second formation treatment fluid, estimating the first environmental impact includes estimating a chemical composition of the first treatment fluid, and estimating the second environmental impact includes estimating a chemical composition of the second treatment fluid.

7. The method of claim 6, wherein comparing includes comparing a number of hazardous materials in the first formation treatment fluid to a number of hazardous materials in the second formation treatment fluid.

8. The method of claim 1, wherein generating the output includes generating a report including one or more numerical values indicating the environmental impact reduction.

9. The method of claim 1, wherein generating the output includes generating a report including an estimation of the environmental impact reduction, the estimation including at least one of water savings and a reduction in an amount of hazardous material.

10. The method of claim 1, wherein the energy industry operation is selected from at least one of a well construction operation, a completion operation, and a production operation.

11. A system for assessing environmental performance, the system comprising:
an input device configured to receive and store input data related to aspects of an energy industry operation associated with extraction of hydrocarbons from an earth formation, the input data including parameters of the energy industry operation, the parameters including a selected type of fluid selected for injection into at least one of a borehole and the earth formation;
a processing device in operable communication with the input device, the processing device configured to perform:
estimating a first environmental impact of the operation based on the input data;
selecting an alternative implementation of the operation, the alternative implementation including an alternative type of fluid that is different than the selected type of fluid;
estimating a second environmental impact of the alternative implementation;
comparing the first environmental impact and the second environmental impact; and
generating an output based on the comparison, the output indicating a change in environmental impact associated with replacing the operation with the alternative implementation.

12. The system of claim 11, wherein estimating the first environmental impact and the second environmental impact includes estimating a chemical composition of the selected type of fluid selected for the operation and the alternative type of fluid selected for the alternative implementation.

13. The system of claim 11, wherein estimating the first environmental impact includes estimating emissions from a fuel selected for the operation, and estimating the second environmental impact includes estimating emissions from an alternative energy source selected for the alternative implementation.

14. The system of claim 11, wherein estimating the first environmental impact includes estimating characteristics relating to water use, and estimating the second environmental impact includes estimating characteristics relating to water use for one or more alternative water use implementations.

15. The system of claim 14, wherein the one or more alternative water use implementations are selected from at least one of water recycling, water treatment and disposal implementations.

16. The system of claim 11, wherein the selected type of fluid is a first formation treatment fluid and the alternative type of fluid is a second formation treatment fluid, estimating the first environmental impact includes estimating a chemical composition of the first treatment fluid, and estimating the second environmental impact includes estimating a chemical composition of the second treatment fluid.

17. The system of claim 16, wherein comparing includes comparing a number of hazardous materials in the first formation treatment fluid to a number of hazardous materials in the second formation treatment fluid.

18. The system of claim 11, wherein generating the output includes generating a report including one or more numerical values indicating the environmental impact reduction.

19. The system of claim 11, wherein generating the output includes generating a report including an estimation of the environmental impact reduction, the estimation including at least one of water savings and a reduction in an amount of hazardous material.

20. The system of claim 11, wherein the input data is received via a user interface, the user interface including user interface elements configured to allow a user to enter characteristics of the operation and select one or more alternative implementations.

21. The system of claim 11, wherein the input data is received real-time via a process interface designed to capture and monitor environmental impact data related to the alternative implementation.

22. The system of claim 11, wherein generating the output includes a generating a real-time report including one or more numerical values indicating the environmental impact related to the alternative implementation.

* * * * *